(12) United States Patent
Lawundy

(10) Patent No.: US 12,420,880 B2
(45) Date of Patent: Sep. 23, 2025

(54) OPERATING DEVICE FOR A HEIGHT-ADJUSTABLE SEATPOST TUBE

(71) Applicant: Canyon Bicycles GmbH, Koblenz (DE)

(72) Inventor: Alexander Lawundy, Bonn (DE)

(73) Assignee: Canyon Bicycles GmbH, Koblenz (DE)

( * ) Notice: Subject to any disclaimer, the term of this patent is extended or adjusted under 35 U.S.C. 154(b) by 262 days.

(21) Appl. No.: 17/955,752

(22) Filed: Sep. 29, 2022

(65) Prior Publication Data
US 2023/0099391 A1    Mar. 30, 2023

(30) Foreign Application Priority Data
Sep. 30, 2021    (DE) .................... 20 2021 105 290.2

(51) Int. Cl.
*B62J 1/06*    (2006.01)
(52) U.S. Cl.
CPC ...................................... *B62J 1/06* (2013.01)
(58) Field of Classification Search
None
See application file for complete search history.

(56) References Cited

U.S. PATENT DOCUMENTS

| 8,814,135 | B2 | 8/2014 | Ams et al. | |
|---|---|---|---|---|
| 2015/0197308 | A1 | 7/2015 | Butora et al. | |
| 2019/0193800 | A1* | 6/2019 | Hara | B62J 45/41 |
| 2019/0301497 | A1* | 10/2019 | Jordan | F15B 15/16 |
| 2019/0351966 | A1 | 11/2019 | Shirai et al. | |
| 2020/0023918 | A1 | 1/2020 | Shirai | |
| 2020/0247498 | A1* | 8/2020 | Yamamoto | B62J 45/4152 |
| 2022/0106005 | A1* | 4/2022 | Shirai | B62K 25/00 |
| 2024/0166286 | A1* | 5/2024 | Chambers | B62J 1/08 |

FOREIGN PATENT DOCUMENTS

| DE | 102009053312 A1 | 5/2011 |
|---|---|---|
| DE | 102019112510 A1 | 11/2019 |
| DE | 102019118493 A1 | 1/2020 |
| EP | 2400193 A1 | 12/2011 |
| EP | 2888157 B1 | 3/2017 |
| EP | 2683599 B1 | 4/2019 |
| EP | 3751182 A1 | 12/2020 |

* cited by examiner

*Primary Examiner* — Philip F Gabler
(74) *Attorney, Agent, or Firm* — The Webb Law Firm

(57) ABSTRACT

An operating device for a height-adjustable seatpost tube including a lifting magnet. The lifting magnet has a magnetic core surrounded by a coil. The magnetic core cooperates with an actuating device of a lifting device, the lifting device being a pneumatic lifting device for height-adjustment of the seatpost tube and thus for heigh-adjustment of the seat, for example.

14 Claims, 2 Drawing Sheets

OPERATING DEVICE FOR A HEIGHT-ADJUSTABLE SEATPOST TUBE

CROSS-REFERENCE TO RELATED APPLICATION

This application claims priority to German Patent Application No. 20 2021 105 290.2 filed Sep. 30, 2021, the disclosure of which is hereby incorporated by reference in its entirety.

BACKGROUND OF THE DISCLOSURE

Field of the Disclosure

The disclosure relates to an operating device for a height-adjustable seatpost tube.

Description of Related Art

In particular for mountain bikes but also for other bicycles it is known to provide lowerable seatposts. Such seatposts have a seatpost tube that carries the seat at its upper end and is made in two parts. An outer tube of the seatpost tube is usually connected to the seat tube of the bicycle frame in a clamping manner. Inside the outer tube of the seatpost tube, an inner tube is displaceable in longitudinal direction. For this purpose, it is known to provide a lifting device inside the seatpost tube, in particular the seatpost tube connected to the seat tube of the bicycle frame. The lifting device has a coil spring, for example. By releasing a locking device, such as a pin or the like, body weight can be used to compress the spring and move the seat downwards to a lower position. In this position, the seat is again locked or held in place with the aid of a locking device or the like. In said lower position of the seat, difficult terrain passages or the like can be easily navigated, for example. By releasing the locking, the seat is pressed back into the upper position with the aid of the spring. It is known to operate the locking device by means of a Bowden cable so that operation is possible with the aid of a lever disposed on the handlebar or another actuation mechanism. Instead of providing a spring as a lifting device, it is also possible to provide a pneumatic and/or hydraulic lifting device, if necessary, also in combination with a mechanical spring. In such operating devices for height-adjustable seatpost tubes, there is in particular the problem that the Bowden cable for the locking device or the actuating device, respectively, should be laid as far as possible inside the frame. In particular in modern bicycles, a plurality of cables, wires and the like are arranged in the frame tubes so that the remaining installation space is small. Due to the height adjustment of the seatpost tube, there is also a change in position of the Bowden cable so that compensating bends are required. This is difficult to realize with modern bicycles due to the limited space available.

Furthermore, in order to operate the lifting device, which is usually hydraulic and/or pneumatic and regulated by a stop valve, it is known to operate the lifting device electrically. This has the advantage that there is no need to lay a Bowden cable from the handlebar to the operating device but only an electric cable. However, in the operating devices described in EP 2888157, for example, it is then required to provide a corresponding electric motor. Said electric motor must be very heavily stepped down in order to be able to apply the required force. However, this leads to undesired time delays since, in particular when riding in challenging terrain, rapid opening or closing of the stop valve is desired. Furthermore, there is the problem that the installation space within the seat tube is very limited and correspondingly strong electric motors cannot be arranged within the seat tube.

SUMMARY OF THE DISCLOSURE

An object of the disclosure is to provide an operating device for a height-adjustable seatpost tube with which reliable and preferably rapid operation of the lifting device of the height-adjustable seatpost tube is made possible in a simple manner.

According to the disclosure, the object is achieved with an operating device for a height-adjustable seatpost tube having the features of as described herein.

According to the disclosure, the operating device for a height-adjustable seat tube according to the disclosure comprises a lifting magnet. The lifting magnet has a magnetic core surrounded by an electric coil. An electrical switching device is connected to the coil. The electrical switching device comprises in particular an electric cable connected to a switch, preferably disposed on the handlebar. By operating the switching device, the magnetic core is preferably moved. For this purpose, the coil is in particular energized in order to cause a movement of the magnetic core. The lifting magnet and preferably the magnetic core of the lifting magnet cooperate with an actuating device. The actuating device is provided for actuating a lifting device of the height-adjustable seat post. The lifting device may be a known conventional lifting device, for example comprising a mechanical spring such as a coil spring and/or a pneumatic device and/or a hydraulic device. This conventional known lifting device now works in such a way that from an upper seating position, after opening a locking or valve, the seat is pushed downwards with the aid of the body weight and thus the height-adjustable seatpost tube is pushed together. In doing so, energy is stored in the form of a compressed spring and/or energy is stored in a corresponding hydraulic and/or pneumatic device or capsule. The operating device according to the disclosure in particular has the advantage that it can be controlled electrically, and in this respect it is not necessary to lay a Bowden cable. Moreover, using a lifting magnet has the significant advantage that said lifting magnet re-quires only a relatively small installation space, and in this respect the lifting magnet can be arranged within the seatpost tube even if it is of a size required to apply the necessary force. Preferably, in a preferred embodiment, forces of more than 20 N, in particular more than 30 N, and, if necessary, also more than 40 N can be generated by such a lifting magnet. Depending on the configuration of the lifting device, such forces are required, for example, to open the valve of a pneumatic and/or hydraulic device.

In a particularly preferred embodiment, a preloading device is provided in addition to the lifting magnet. Here, the preloading device is preferably arranged such that it supports the lifting magnet. In particular, the preloading device is used to press the lifting magnet in the direction of an actuating device so that only a small force is required by the lifting magnet to operate the actuating device. In a preferred embodiment, this force is less than 40 N or possibly even less than 30 N.

The particularly preferred embodiment according to the disclosure of the combination of a lifting magnet together with a supporting preloading device makes it possible to realize a particularly compact design of a corresponding operating device for a height-adjustable seatpost tube according to the disclosure. In particular, it is possible to provide a lifting magnet which can be arranged within the seat tube or the seatpost tube. Such a lifting magnet, which is limited in size due to its installation space, could not by itself apply the force required to open a valve of a pneumatic and/or hydraulic device. The preloading device provided in a particularly preferred embodiment according to the disclosure can significantly increase the force. Only due to the addition of the force applied by the lifting magnet and the preloading device it is possible to realize an operating device with a small installation space by means of which the corresponding valve can be opened, in particular with a short time delay.

The preloading device preferably has a preloading spring or is designed as a preloading spring. Preferably, the preloading spring is a coil spring, wherein it is further preferred that the force applied by the preloading device is aligned parallel and in particular coaxial to the force applied by the lifting magnet.

Preferably, whether or not a supporting preloading device is provided, the actuating device is connected to a front side of the magnetic core and preferably rests thereon. This has the advantage that force can be transferred directly from the magnetic core to the actuating device. The actuating device may be bar-shaped and extends in a particularly preferred embodiment in longitudinal direction of the magnetic core or in force direction of the magnetic core, respectively. This has the advantage that the force applied by the magnetic core and possibly by the additionally provided preloading device is transferred, in particular completely, to the actuating device and the loss of force is as low as possible.

If a preloading device is provided, in particular in the form of a preloading spring, it is particularly preferred that the preloading device also acts on a front side of the magnetic core. In particular, the front side with which the preloading device cooperates, is the front side opposite the front side of the magnetic core that cooperates with the actuating device. Thus, it is particularly preferred that the longitudinal or force direction of the preloading device, the longitudinal or force direction of the magnetic core, and the longitudinal direction of the actuating device are parallel, in particular coaxial to one another.

In a preferred further embodiment of the disclosure, the preloading device may be connected to an adjusting device for adjusting a preloading force. In particular, this ensures that the preloading device always rests on components to which the force is transferred. This serves to prevent noise and reduces the loss of force. In particular, the preloading device may be formed as a bolt which, in the case of a preloading device preferably formed as a preloading spring, applies a preloading force thereto in the longitudinal or force direction.

In the preferred embodiment, in which a preloading device is provided in addition to the lifting magnet, it is preferred that the force required to operate the lifting device is applied partially by the preloading device and partially by the lifting magnet. Preferably, the preloading device applies 20 to 50% of the force required to actuate the lifting device.

Preferably, the lifting magnet is at least partially, in particular completely arranged inside a housing. In particular, the housing may be formed such that in addition the preloading device is also at least partially, in particular completely arranged therein.

After moving the magnetic core in the coil by a corresponding actuation with the aid of the electrical switching device, the magnetic core is preferably moved as far as to an actuating position. This is the position in which an actuation of the lifting device of the height-adjustable seatpost tube is ensured. In order to ensure clear definition of said actuating position, a stop for the magnetic core is preferably provided. A corresponding stop can be connected to the housing or integrally formed therewith.

BRIEF DESCRIPTION OF THE DRAWINGS

In the following, the disclosure is described in more detail by means of a preferred embodiment with reference to the accompanying drawings.

In the drawings.

DETAILED DESCRIPTION

Figure 1:
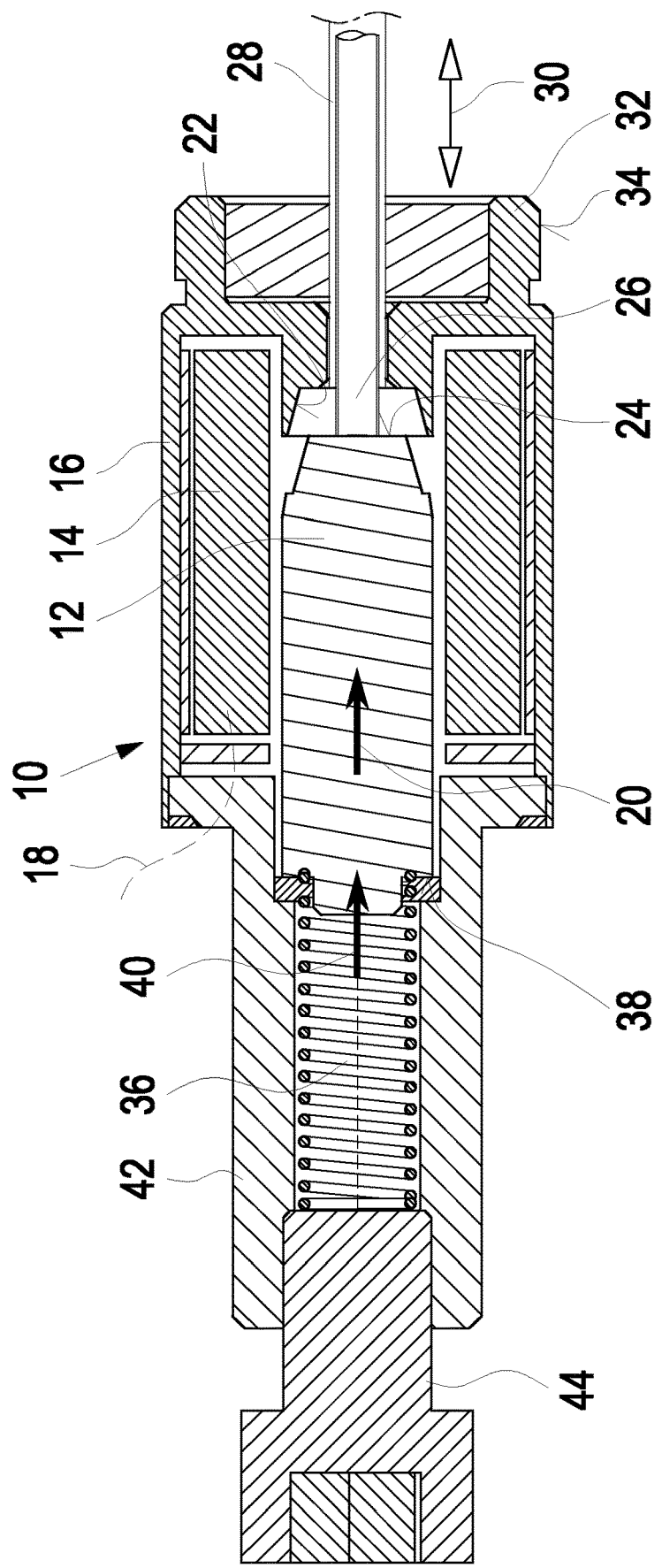
FIG. 1 is a schematic sectional view of an operating device for a height-adjustable seatpost tube according to the disclosure.

The operating device for a height-adjustable seatpost tube according to the disclosure comprises a lifting magnet 10. The lifting magnet 10 comprises a magnetic core 12 and an electric coil surrounding the magnetic core 12. The lifting magnet 10 is arranged inside a housing 16. Furthermore, the lifting magnet 10 is connected to a switch arranged in particular on the handlebar via an electrical line 18 shown in dashed lines, so that the line 18 is part of the switching device. The switching device can be used to energize the coil 14, which is further connected to a power source, to generate a magnetic force. When the switching device is switched on, the magnetic core 12 is displaced from the rest position shown in FIG. 1 in the direction of an arrow 20 to an actuating position.

In the illustrated embodiment, the housing 10 is arranged in a pot-like manner and encloses the coil on the right side in FIG. 1. Thus, a stop 22 designed as a frustoconical opening is formed. In this stop 22, the magnetic core 12 is moved and then connects in the stopped position in the actuating position.

A pin-shaped element 26 of an actuating device rests on a right-hand front side 24 of the magnetic core in FIG. 1. The pin-shaped element 26 is guided in a tube 28 in longitudinal direction 30. Thus, moving the magnetic core 12 in the direction of the arrow 20 to the actuating position causes the pin-shaped element 26 in FIG. 1 to move to the right, also to the actuating position.

The front side 24 of the magnetic core 12 is the front side facing in the direction of the lifting device of the height-adjustable seatpost tube. In the mounted state, the front side substantially faces upwards.

The housing 10 has an external thread 34 on a cylindrical lug 32. The external thread 34 can be used to connect the operating device to a tube of the height-adjustable seatpost tube. In particular, this involves the connection to an outer tube of a seatpost tube that has, in particular, two tubes that can be telescoped into one another. The outer tube is stationary and firmly connected to the seat tube of the frame.

In the illustrated preferred embodiment, a preloading device in the form of a preloading spring 36 is provided to support the lifting magnet 10. The preloading spring 36 cooperates with a front side 38 of the magnetic core 12 opposite the front side 24. The preloading spring 36 generates a force 40 that is coaxially directed with respect to the longitudinal or force direction 20 of the magnetic core 12. A lug 42 of the housing 10 surrounds the preloading spring 36 so that the preloading spring 36 is arranged in a cylindrical recess of the lug 42.

An adjustment device 44 is arranged on the side of the preloading spring 36 facing away from the magnetic core 12. In the illustrated exemplary embodiment, the adjustment device 44 is a bolt by means of which the spring 36 can be preloaded. This ensures that the spring 36 always exerts its force on the pin 26 and thus on the actuating device for actuating the lifting device via the magnetic core 12 even in the rest position, i.e. in the de-energized position. The force applied by the preloading spring 36 adds to the force applied by the magnetic core 12 when operating the actuating device.

Figure 2:
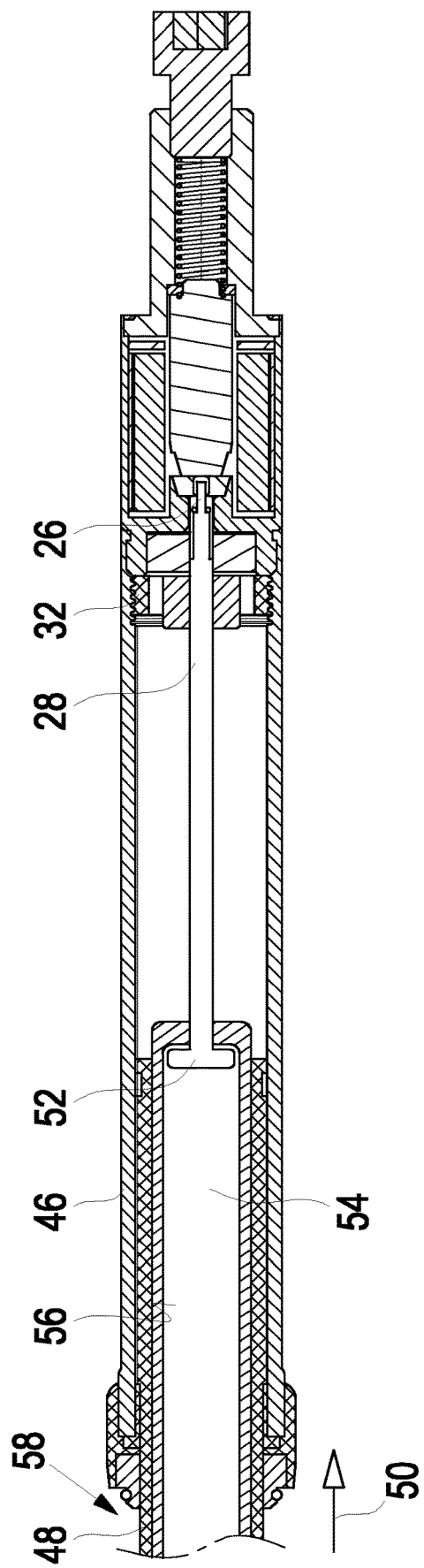
FIG. 2 is a schematic sectional view of a lifting device designed as a pneumatic device of the height-adjustable seatpost tube.

The actuating device may be a pneumatic device such as illustrated in FIG. 2.

Said device has an outer seatpost tube 46 that is fixed in a clamping manner in the seat tube of the frame by a clamping mechanism that is not illustrated. Depending on the size of the user, the seatpost tube 46 can be fixed in different positions in the seat tube of the bicycle frame. Connected to the outer seatpost tube 46 is an inner seatpost tube 48 which can be moved from the extended position shown in FIG. 2 for height adjustment in the outer seatpost tube 46 in the direction of an arrow 50. This makes is possible, after operating the actuating device 26, to move the inner seatpost tube 48 with the aid of the body weight in the direction of the arrow 50. In this case, the tube 28 is stationary and is not moved and has a plate-shaped element 52 similar to a piston at the end pointing in the direction of the inner seatpost tube 48. Thus, when moving the inner seatpost tube 48 in the direction of the arrow 50, air is compressed within a cavity 54 of a cartridge 56 disposed inside both the outer and inner seatpost tubes.

To move a seat connected to an upper end 58 of the inner seatpost tube 48 back to the upper seating position, the pin-shaped member 56 is moved with the aid of the lifting magnet 10 as described above. This opens a valve located in the plate-shaped member 52.

The invention claimed is:

1. An operating device for a height-adjustable seatpost tube comprising:
   an outer seatpost tube;
   an inner seatpost tube, such that the inner seatpost tube is at least partially located within the outer seatpost tube;
   a lifting magnet located in a housing, the lifting magnet having a coil surrounding a magnetic core such that the housing is disposed at and operatively connected to a bottom end of the outer seatpost tube;
   an electrical switching device connected to the coil;
   an actuating device cooperating with the magnetic core for actuation of a lifting device of the height-adjustable seatpost tube;
   a preloading device having a first end and a second end, the first end acting on a front side of the magnetic core; and
   an adjustment device located at the second end of the preloading device,
   wherein the lifting device is selected from a pneumatic device, a hydraulic device, and/or a spring device, and
   wherein the inner seatpost tube can be adjusted by a user by actuation of the lifting device.

2. The operating device according to claim 1, wherein the actuating device is connected with the front side of the magnetic core.

3. The operating device according to claim 2, wherein the front side of the magnetic core cooperating with the actuating device is opposite a rear side cooperating with the preloading device.

4. The operating device according to claim 2, wherein the actuating device rests on the magnetic core.

5. The operating device according to claim 1, wherein the actuating device is bar-shaped.

6. The operating device according to claim 5, wherein the actuating device extends in a longitudinal direction of the magnetic core.

7. The operating device according to claim 1, wherein a stop for the magnetic core connects in a stopped position in an actuating position.

8. The operating device according to claim 1, wherein the lifting magnet is disposed at least partially inside the housing.

9. The operating device according to claim 8, wherein a stop is connected to the housing.

10. The operating device according to claim 9, wherein the stop is integrally formed with the housing.

11. The operating device according to claim 1, wherein the preloading device is a preloading spring.

12. The operating device according to claim 11, wherein the preloading device rests on the magnetic core.

13. The operating device according to claim 11, wherein the preloading device is connected to an adjusting device for adjusting a preloading force.

14. The operating device according to claim 1, wherein a force required to operate the lifting device is applied partially by the preloading device and partially by the lifting magnet.

* * * * *